G. S. MAXWELL.
AUTOMOBILE WHEEL TRACTION DEVICE.
APPLICATION FILED DEC. 14, 1915.
1,203,764.
Patented Nov. 7, 1916.
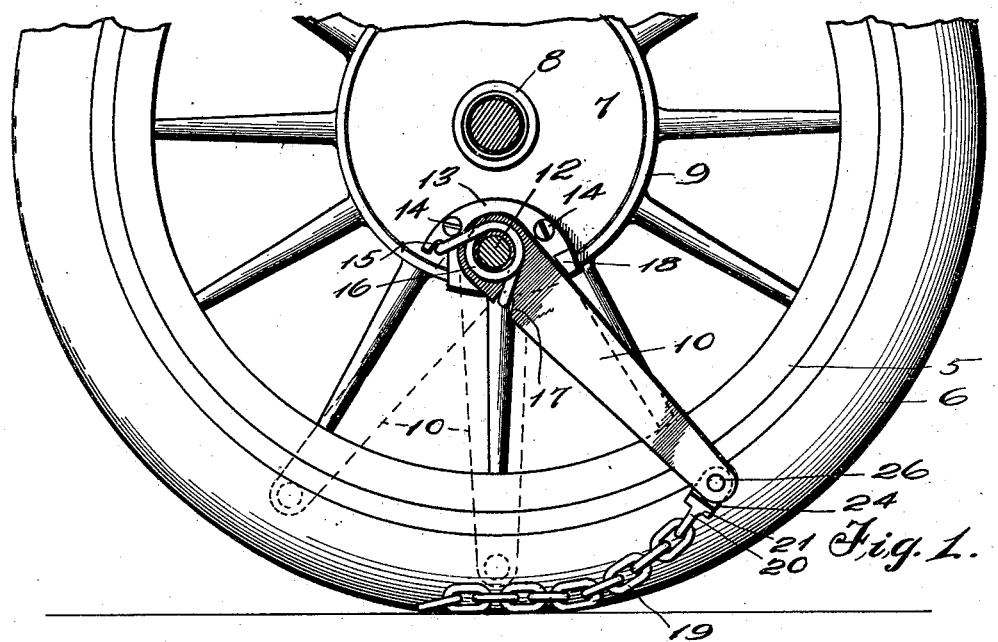
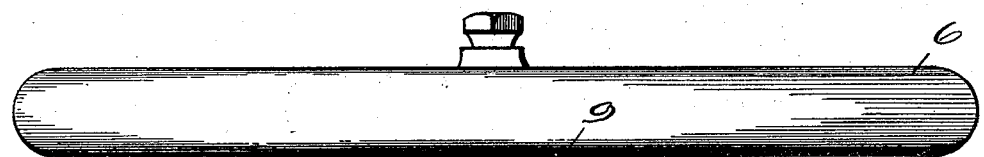
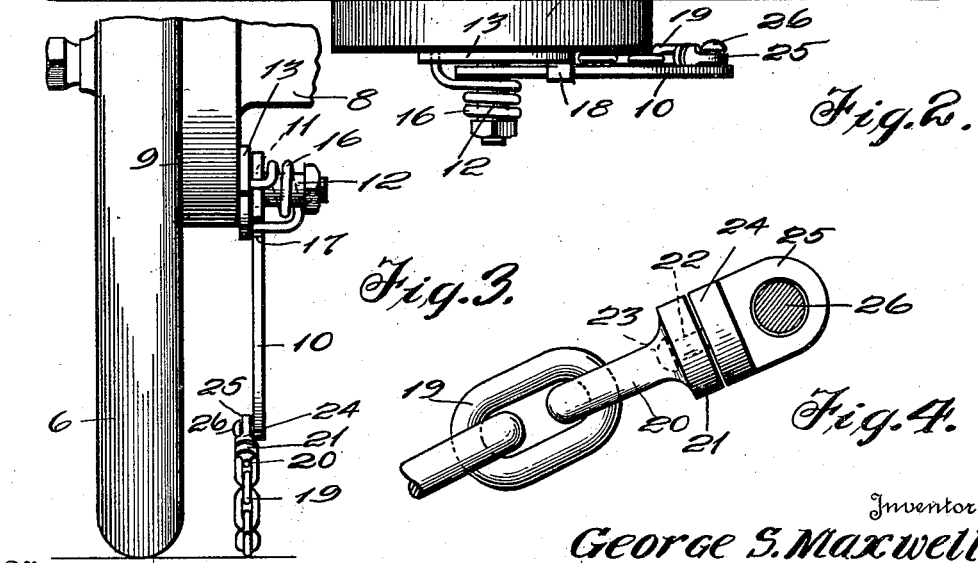

UNITED STATES PATENT OFFICE.

GEORGE S. MAXWELL, OF WASHINGTON, DISTRICT OF COLUMBIA, ASSIGNOR OF ONE-HALF TO MAYNARD A. BAYLES, OF WASHINGTON, DISTRICT OF COLUMBIA, AND WILLIAM F. HALE, OF NOKESVILLE, VIRGINIA.

AUTOMOBILE-WHEEL TRACTION DEVICE.

1,203,764.  Specification of Letters Patent.  Patented Nov. 7, 1916.

Application filed December 14, 1915. Serial No. 66,763.

*To all whom it may concern:*

Be it known that I, GEORGE S. MAXWELL, a citizen of the United States, residing at Washington, in the District of Columbia, have invented certain new and useful Improvements in Automobile-Wheel Traction Devices, of which the following is a specification.

My invention relates to improvements in traction devices, designed for use in connection with rubber tires, inflated or solid, of automobiles or other vehicles, for preventing skidding or side slipping.

In the accompanying drawings forming a part of this specification and in which like numerals are employed to designate like parts throughout the same, Figure 1 is a side elevation of a device embodying the invention, showing the same in use, Fig. 2 is a plan view of the same, Fig. 3 is a side elevation, and, Fig. 4 is an enlarged detail elevation of one end of the flexible traction element or chain, showing its manner of connection with its lever.

In the drawings, wherein for the purpose of illustration is shown a preferred embodiment of my invention, the numeral 5 designates the wheel of an automobile, equipped with a tire 6, which may be a pneumatic tire or a solid tire. This wheel is provided with the usual brake mechanism, comprising a relatively stationary cylinder 7, rigidly mounted upon the rear axle casing 8, and a drum 9, rotatable about the relatively stationary member or cylinder 7, as is customary.

My device comprises an arm or crank 10, the inner end of which is apertured, as shown at 11, for receiving a pivot element, stud, or trunnion 12, rigidly mounted upon an attaching plate or member 13. This plate or member 13 is rigidly attached by means of screws or bolts 14, to the relatively stationary cylinder 7. It is to be distinctly understood that the invention is in no sense restricted to attaching the plate or member 13 to the cylinder 7, as it may be rigidly secured to any relatively stationary part of the automobile. In the present instance, where the arm or crank 10 is disposed upon the inner side of the wheel 5, it has been found more convenient to secure the plate 13 to the drum 7.

One end of the plate or member 13 is provided with a recess or notch 15, receiving one end of a coil spring 16, carried by the stud 12, the opposite end of this spring engaging within a notch 17 formed in the arm 10, near and spaced from its pivot. The spring 16 serves to move the arm 10 forwardly, in contact with a stop or shoulder 18, rigidly mounted upon the plate 13 and preferably formed integral therewith. Particular attention is called to the fact that the spring 16 normally holds the arm or crank 10 in a forwardly inclined position, whereby its lower end is arranged in advance of the vertical transverse axis of the wheel, this arm however being adapted to be swung rearwardly past the vertical transverse axis to occupy the position indicated in dotted lines.

The numeral 19 designates a road engaging traction element, preferably flexible and preferably formed of a section of chain. This chain embodies a forward connecting link 20, having a head 21. This head 21 is provided with a longitudinal opening 22, pivotally receiving a headed pin 23, rigidly secured to the head 24 of a coupling element 25. This coupling element is substantially flat and is arranged upon one side of the free end of the lever 10 and is pivotally connected therewith by means of a pin or stud 26. It is thus apparent that the forward end of the chain 19 has a double swiveled or universal connection with the outer end of the arm 10. The function of this construction is to prevent the twisting or binding of the chain whereby it would be thrown under the wheel, at improper times.

In operation, the flexible traction element or chain 19 is preferably arranged upon the inner side of the tire 6 and is dragged along the road bed from its forward end by virtue of the arm 10. The arm 10 normally occupying the inclined position in advance of the vertical axis of the wheel, the major portion of the flexible element or chain 19 will be arranged adjacent the tire 6 at its point of contact with the road bed. When the wheel skids, the chain 19 by contact with the ground will assume a more or less transverse position with relation to the tire 6, and this tire will move across and upon the chain 19, thus gaining traction. As soon as this occurs, the chain 19 remaining stationary while the wheel rolls over it, the arm 10 will be pulled rearwardly past the vertical transverse axis of the wheel, to the position shown by dotted lines in Fig. 1. The chain 19 will therefore be drawn out of engagement with the tire 6, at which time the spring 16 automatically returns the chain to its normal position, inwardly of and parallel with the plane of rotation of the wheel 6. It is thus apparent that as soon as the wheel regains its traction the chain disengages with the tire and assumes a position whereby the operation may be repeated when necessary. It is apparent that the particular advantage gained by this construction is that the chain does not contact with the tire when unnecessary, thus prolonging the life of the tire, but this chain is at once thrown into action upon skidding, without the mediation of the operator.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

In apparatus of the character described, an attaching member arranged near and upon one side of a wheel of an automobile and connected with a relatively stationary part of the automobile and having a forward stop element, a stud carried by the attaching member, an arm having its inner end apertured to pivotally receive the stud and its lower end arranged in advance of the point of contact of the tire of the wheel with the road bed when the arm contacts with the stop element, a coil spring carried by the stud and having one end engaging the attaching element and the other end engaging the arm to move it forwardly into contact with the stop element, a flexible traction element normally arranged in a plane parallel to the plane of rotation of the wheel, and a universal joint connecting the forward end of the flexible traction element with the outer end of the arm.

In testimony whereof I affix my signature in presence of two witnesses.

GEORGE S. MAXWELL.

Witnesses:
B. P. FISHBURNE,
G. C. JARVIS.

Copies of this patent may be obtained for five cents each, by addressing the "Commissioner of Patents, Washington, D. C."